No. 839,016. PATENTED DEC. 18, 1906.
G. W. MacDONALD.
OPTICAL DEVICE.
APPLICATION FILED NOV. 1, 1905.
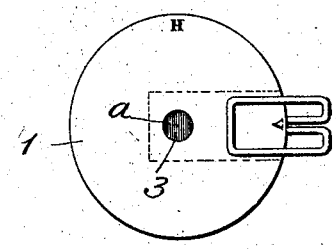
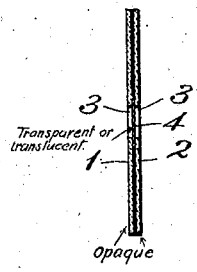
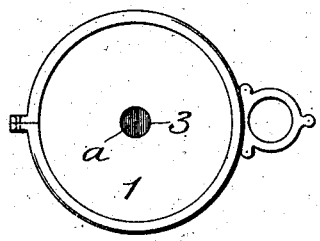
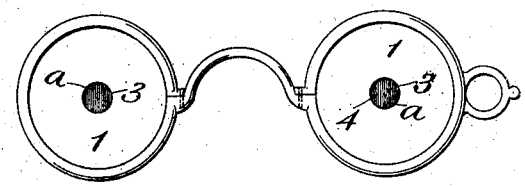
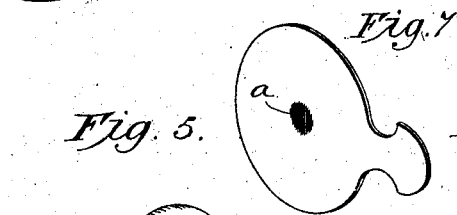
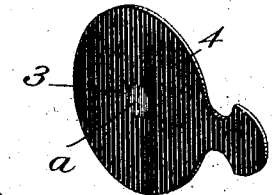
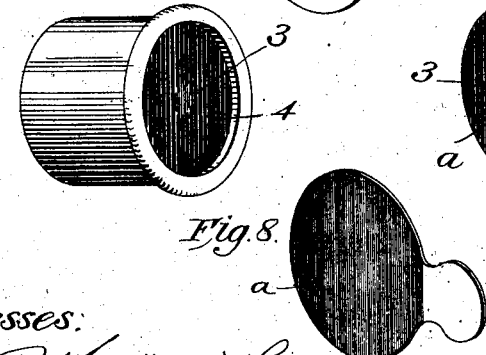
Witnesses:
Inventor,

UNITED STATES PATENT OFFICE.

GEORGE W. MacDONALD, OF PHILADELPHIA, PENNSYLVANIA.

OPTICAL DEVICE.

No. 839,016.   Specification of Letters Patent.   Patented Dec. 18, 1906.

Application filed November 1, 1905. Serial No. 285,484.

*To all whom it may concern:*

Be it known that I, GEORGE W. MACDONALD, a citizen of the United States, residing at the city of Philadelphia, in the county of Philadelphia and State of Pennsylvania, have invented certain new and useful Improvements in Optical Devices, of which the following is a specification.

My invention relates to an optical device to be used for scientific demonstrations or as a toy and which is especially adapted as an attractive advertising medium.

The main object of the invention is to produce an optical instrument on looking through which an opaque object is caused to appear transparent, although other novel and striking effects are produced by its use.

In the accompanying drawings, Figure 1 shows a face view of the invention in a simple form. Fig. 2 is a transverse section. Fig. 3 shows the device mounted in a single case, Fig. 4 in a double case, and Fig. 5 in a tube. Fig. 6 shows in perspective a modified form of the invention. Figs. 7 and 8 show further modifications.

Similar characters of reference indicate similar parts in the respective figures.

Referring to Figs. 1 and 2, 1 2 represent disks of opaque material, which may be of cardboard, celluloid, metal, or other substance. Each of the said disks is centrally perforated, as at 3, and between the disks is placed a transparent or translucent medium 4. The latter is provided with fine parallel lines $a$, produced by a cutting, etching, pressing, or other operation, the said lines being adapted to run either horizontally or vertically with respect to the position in which the device is held or supported. The transparent or translucent medium 4 may be of glass, isinglass, gelatin, or other suitable substance and by preference is closely and immovably confined between two disks, as shown. However, it is not essential that the transparent or translucent medium 4 shall be separate from the supporting or contiguous disk or disks, as the whole, as seen in Fig. 5, may be made of the same material, the central portion at 3 only being transparent or translucent and provided with fine parallel lines, as described, while the remaining portion of the disk or disks may be painted or in other manner rendered opaque.

In producing the illusory effect or phenomena hereinafter described the device, if used in its single form—as shown, for example, in Figs. 1 and 2—is held up to the eye by the hand, or if in the double form (shown in Fig. 4) may be supported in front of both eyes as a spectacle or eyeglass. It will be found on looking through the device held up against the light that, due to the refraction consequent upon the presence of the parallel lines $a$, an opaque object, as the human hand, placed somewhat behind the instrument will appear transparent and an apparent extension of objects beyond the hand and in the field will be visible. Many other and varied phenomena are obtained by the use of my invention. By turning the instrument one-quarter of a revolution from one point each line from vertical to horizontal will be shown through the intervening solid, provided one or both ends project into the field of vision.

It is obvious that my invention is capable of utilization in a variety of forms. As a toy it will be found highly entertaining. The directions for use may appear upon the face of one of the disks, while the reverse disk or side of the device may be advantageously used to contain advertising matter.

Thus while I have preferably described my invention as embodying an opaque substance having a portion of its surface removed and furnished with a transparent or translucent medium provided with fine parallel lines, it is within my invention, broadly, to employ a transparent or translucent medium alone having such lines either in a circumscribed area or extending entirely across the body. Under this form of my invention, as seen in Figs. 7 and 8, the device is made of a transparent or translucent material having the parallel lines $a$.

Having thus described my invention, I claim—

1. A device for producing the optical illusion of causing a solid body to appear transparent or translucent or the phenomena described, consisting in centrally-perforated opaque disks having interposed between them a transparent or translucent body provided with fine parallel lines, substantially as set forth.

2. A device for causing the optical illusion of making opaque objects appear transparent, comprising a transparent or translucent member having a surface thereof formed, throughout its operative portion, of a plurality of fine parallel reflecting and refracting surfaces separated by intervening plane surfaces arranged to change the direction of some of the rays of light passing through the member from the field of view toward which it may be directed, substantially as set forth.

In testimony whereof I affix hereto my signature in presence of two witnesses.

GEORGE W. MacDONALD.

Witnesses:
    JAY R. GRIER,
    CHAS. C. COLLIER.